Aug. 16, 1960  C. T. BUSSE  2,949,179
MACHINE FOR STACKING CANS ON PALLETS
Filed March 21, 1958  11 Sheets-Sheet 2

Fig. 2.

Inventor
Curtis T. Busse
By ... Jones
Attorney

Aug. 16, 1960     C. T. BUSSE     2,949,179
MACHINE FOR STACKING CANS ON PALLETS
Filed March 21, 1958     11 Sheets-Sheet 3

Inventor
Curtis T. Busse

Aug. 16, 1960    C. T. BUSSE    2,949,179
MACHINE FOR STACKING CANS ON PALLETS
Filed March 21, 1958    11 Sheets-Sheet 6

Aug. 16, 1960     C. T. BUSSE     2,949,179
MACHINE FOR STACKING CANS ON PALLETS
Filed March 21, 1958     11 Sheets-Sheet 9

Inventor
Curtis T. Busse
By
Attorney

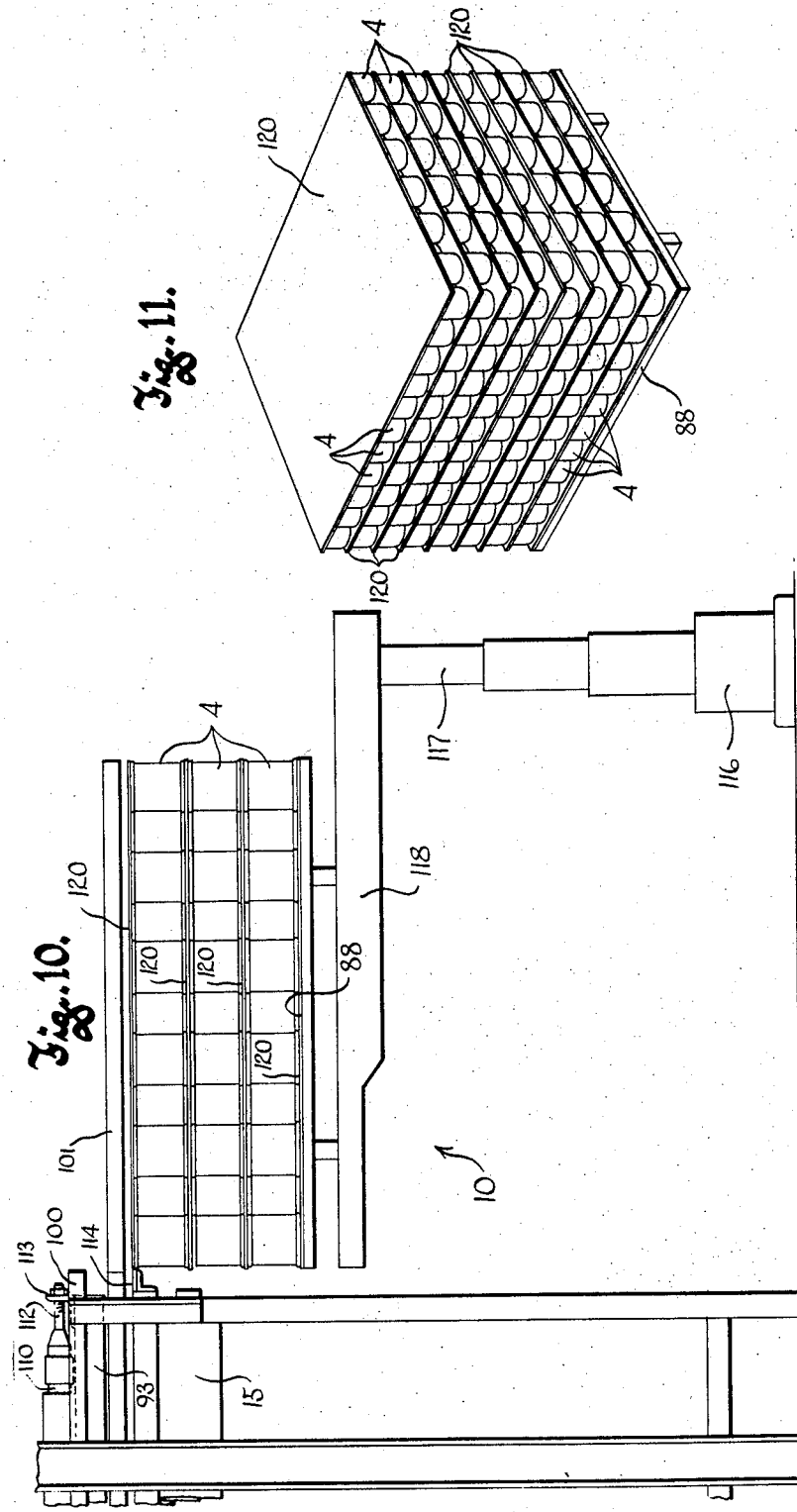

Aug. 16, 1960 C. T. BUSSE 2,949,179
MACHINE FOR STACKING CANS ON PALLETS
Filed March 21, 1958 11 Sheets-Sheet 11
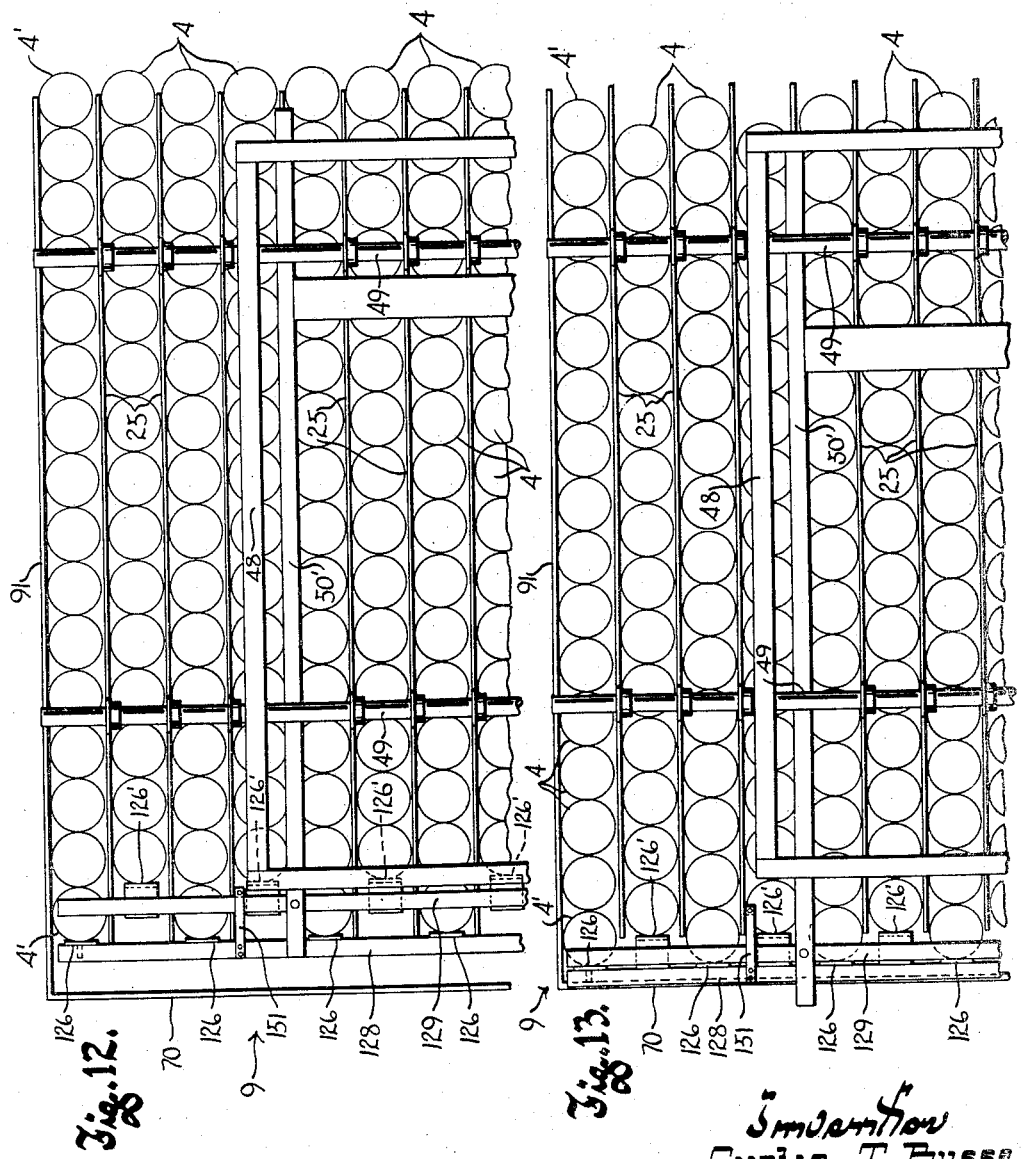

United States Patent Office 2,949,179
Patented Aug. 16, 1960

2,949,179

MACHINE FOR STACKING CANS ON PALLETS

Curtis T. Busse, Randolph, Wis., assignor of fifty percent to Gilbert W. Busse, Randolph, Wis.

Filed Mar. 21, 1958, Ser. No. 723,031

18 Claims. (Cl. 198—30)

This invention relates to a machine for handling tin cans and similar substantially cylindrical articles, and refers more particularly to a machine for arranging cylindrical cans into compact rectangular patterns, each containing a predetermined number of cans and adapted to comprise one layer of a uniform stack of cans, and for stacking such layers of cans on a pallet or similar surface.

The general object of this invention is to provide a machine for arranging cylindrical cans or similar articles having a uniform height and diameter, and all having their axes upright, into compact, uniform patterns, each adapted to form one layer of a stack of cans that may be packaged and stored or transported on a pallet of the type intended to be handled by a fork lift truck.

For the most compact arrangement of a group of upright cylindrical cans of uniform diameter, the cans should be aligned in straight, laterally adjacent files, with the files staggered lengthwise so that each can is half a diameter out of lateral alignment with the adjacent cans in the files on each side of it. Except for cans at the edges of the group, each can is thus in contact with six other cans, namely two cans in each of the two files on its opposite sides, and the can in front of it and the can behind it in its own file. Such an arrangement of cans corresponds quite closely to the geometry of the cells of a honeycomb, and for convenience is hereinafter referred to as a honeycomb pattern.

When a layer of cans is arranged as just described, and a band or wrapper is fastened around the layer, the cans in the wrapper will have no tendency to shift from side to side. If several identical layers of cans, each arranged in a rectangular honeycomb pattern, are stacked one on top of the other, the entire stack of cans can be enclosed in a paper wrapper to form a stable package having rectangular sides. Such a package is easy to handle, particularly if it is made in a size to fit readily on a fork lift truck pallet, and because of its compactness and stability it is economical to ship.

A machine for arranging cans coming off of a can making machine into stacks suitable for a fork lift pallet has long been desired by the can manufacturing industry. However, previous attempts to achieve such a machine have been unsuccessful because the proposed devices could not be depended upon to produce uniformly arranged layers of cans in the stacks they made, but instead left frequent gaps in the pattern of cans comprising the layers of the stack. If a layer of cans in such a package has one or more cans missing from the desired pattern, all of the cans in that layer will be free to shift around, and unless rigid separators are provided between layers, cans in adjacent layers will also tend to move vertically into the gap or gaps left by the missing cans. As a result, cans will begin to shift all through the package, possibly tearing the wrapper in which they are enclosed, or, if the package arrives at its destination with its wrapper intact, tumbling down in an avalanche as soon as the package is opened.

The present invention has for its principal object the provision of a method of arranging cans in a stack suitable for packaging and palletizing, with the cans in each layer of the stack arranged in a honeycomb pattern having no gaps therein, and which method may be practiced by means of relatively simple and largely automatic machinery.

It is also an object of this invention to provide a simple, inexpensive and efficient machine for practicing said method, by which machine upright cylindrical cans of uniform height and diameter may be rapidly gathered and organized into uniform compact groups, each group having a honeycomb pattern of cans, and by which machine the groups of cans thus formed may be transferred to a pallet and stacked thereon in accurate vertically superimposed relationship. For convenience the machine of this invention is hereinafter referred to as a can palletizing machine, in view of its utility for stacking cans on a fork lift truck pallet, but it will be appreciated that the machine of this invention is adapted for the arrangement of upright cylindrical articles of any kind into uniform rectangular layers or groups having a honeycomb pattern.

Another object of this invention is to provide a can palletizing machine which is capable of patterning and/or stacking upright substantially cylindrical articles of any kind, and which is particularly intended for use in conjunction with a can manufacturing machine, the can palletizing machine of this invention being adapted to be located at the outlet end of a conveyor on which finished cans are carried out of the can making machine.

A more specific object of this invention resides in the provision of a machine for organizing cylindrical tin cans or the like, disposed at random along a conveyor with their axes upright, into a rectangular pattern of straight laterally adjacent files, with the files staggered to dispose the cans in each file half a can diameter out of alignment with the cans in adjacent files, so that the cans in the pattern thus formed are organized in a compact honeycomb arrangement.

Another object of this invention is to provide a machine for arranging cans or other cylindrical articles into honeycomb patterns, each having a generally rectangular outline, and with either an equal number of cans in every file of the pattern or with alternate files having one more can than the files between them; but in either event an important objective attained by the machine of this invention is the consistent arrangement of cans or the like into honeycomb patterns, each pattern containing a predetermined number of cans in a honeycomb arrangement.

It is another specific object of this invention to provide a machine for arranging cans or other articles of the character described in rows or files; for relatively nudging every other file of cans lengthwise of the file in one direction, through a distance equal to substantially half a can diameter, to thus form the cans into a honeycomb pattern of staggered files; for thereafter moving the entire pattern of cans laterally onto a pallet through a distance at least equal to the width of the pattern, without disrupting the pattern, each pattern being moved to the same position as the others to permit formation of a uniform stack; and for lowering the pallet by a distance equal to the can height after each pattern of cans is placed thereon, to permit another similar layer to be stacked on top of the pattern of cans just placed on the pallet.

It is also a specific object of this invention to provide a can palletizing machine of the character described having a gathering zone in which cans moving along a conveyor in random arrangement are aligned in files, and a patterning zone into which a predetermined number of cans may be admitted from the gathering zone and wherein alternate files of cans are nudged half a can diameter in one direction relative to their neighboring files to form a honeycomb pattern of cans, and having sweep means for transferring to a pallet the cans thus patterned, without disrupting the pattern.

With the above and other objects in view which will appear as the description proceeds, this invention resides in the novel apparatus substantially as hereinafter described and more particularly defined by the appended claims, it being understood that such changes in the precise embodiment of the hereindisclosed invention may be made as come within the scope of the claims.

The accompanying drawings illustrate two complete examples of physical embodiments of the invention constructed according to the best modes so far devised for the practical application of the principles thereof, and in which:

Figure 2 is a longitudinal sectional view on an enlarged scale of the patterning zone and front portion of the gathering zone of the machine illustrated in Figure 1;

Figure 5a is a fragmentary horizontal sectional view showing the means for unlatching the rear wall member from the remainder of the sweep;

Figure 10 is a fragmentary end elevational view of the pallet zone, the hoist mechanism being shown diagrammatically;

Figure 11 is a perspective view of a stack of cans arranged on a pallet by means of the machine of this invention;

Figure 12 is a plan view of the patterning zone of a modified embodiment of the machine of this invention, with the patterning zone preliminarily filled with files of cans; and Figure 13 is a view similar to Figure 12, but showing the machine with the cans in the patterning zone disposed in staggered files.

Figure 1:
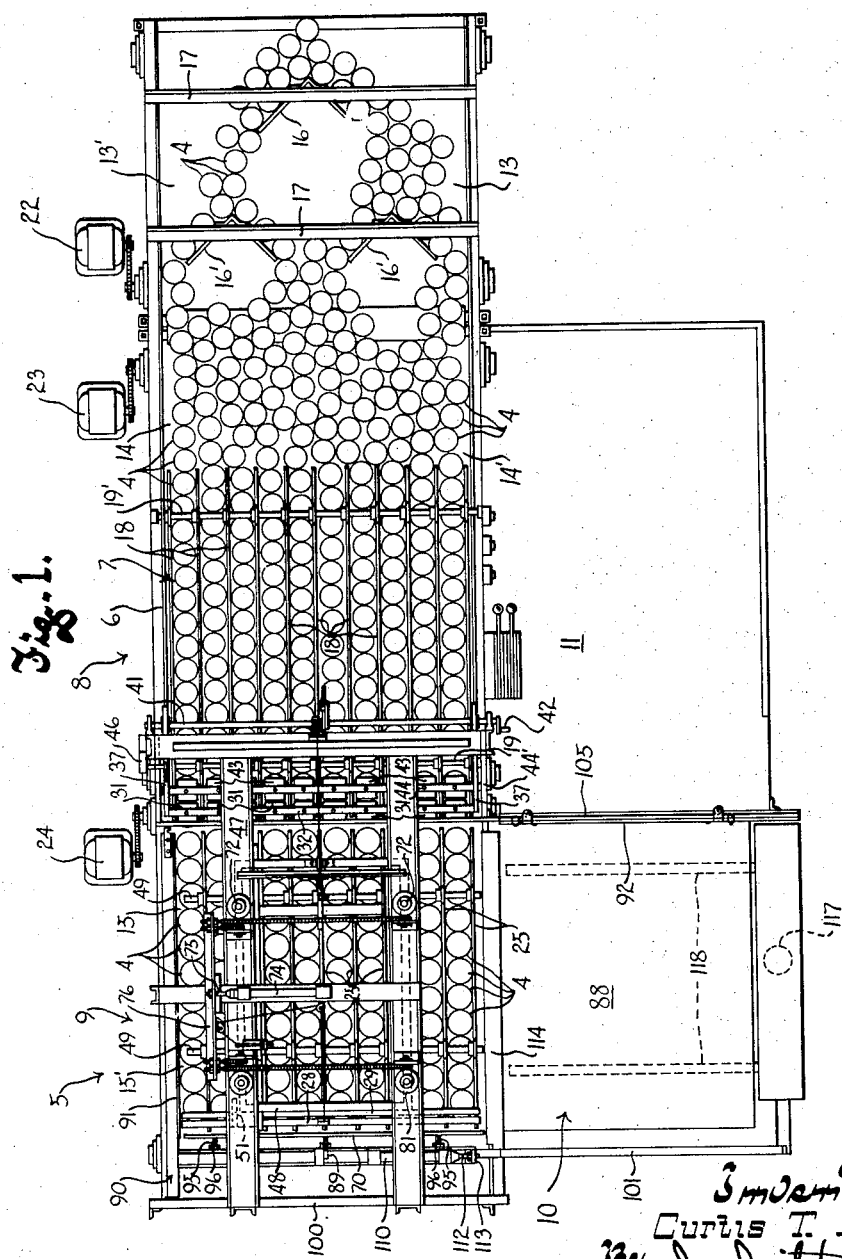
Figure 1 is a top elevational view of the can palletizing machine of this invention with the patterning zone preliminarily filled with files of cans.

Referring now to the accompanying drawings in which like numerals designate like parts throughout the several views, the numeral 5 designates generally a can palletizing machine embodying the principles of this invention which, as viewed from the top, has a generally L-shaped configuration. The stem of the L comprises an elongated frame 6 along which extends conveyor means designated generally by 7 whereby cans 4 or other cylindrical articles fed onto the machine at the rear thereof are carried forwardly through a gathering zone 8 and into a patterning zone 9 at the front of the machine. The base of the L is provided by a pallet zone 10 laterally adjacent to the patterning zone and into which the machine transfers cans from the patterning zone. In the corner between the gathering zone and the pallet zone is an operator's position 11 at which the controls for the machine are accessible, and from which the operation of all parts of the machine may be readily observed.

It will be understood that the cans fed onto the conveyor means may be issuing out of a can making machine (not shown), or from any other source, and are of uniform size and shape, but they need not be placed on any particular part of the conveyor and may be distributed at random along and across the conveyor. All of them, however, will be placed on the conveyor with their axes upright.

Rotatably mounted on the frame 6 are a plurality of rollers 12 which extend across the stem portion of the L, and trained around these rollers are endless belts 13, 14 and 15 comprising the conveyor means 7. The belts 13 and 14 have endwise adjacent upper stretches 13' and 14', respectively, which together extend from the rear end of the machine to the front of the gathering zone, and the belt 15 has a straight upper stretch 15' extending through the patterning zone. The belts 13, 14 and 15 are respectively driven in orbital motion by electric motors 22, 23 and 24, and the upper belt stretches 13', 14' and 15' all move in the same direction.

Overlying the upper stretch 13' of the rear belt, near the rear of the machine and intermediate the side edges of the conveyor, is a V-shaped spreader 16, and farther forward are mounted a pair of such spreaders 16', disposed in side-by-side spaced apart relationship. These several spreaders are fixedly suspended from bars 17 that are secured to the frame and extend laterally over the conveyor. All of the spreaders have their apexes rearmost so that they engage the cans as the latter ride forwardly on the belt stretch 13' and the spreaders distribute the cans substantially evenly across the width of the conveyor.

As the cans continue their forward travel on the conveyor they encounter a plurality of fixed dividers 18 comprising thin elongated strips, vertically on edge, extending fore-and-aft and spaced apart by distances substantially equal to the diameter of a can. Longitudinally spaced apart supporting rods 19 and 19' that extend transversely across the conveyor at a substantial distance above the same hold the dividers with their lower edges spaced slightly above the belt stretch 14', the supporting rods being fixed at their ends to stationary parts of the frame. The dividers 18 extend over the forward portion of the belt stretch 14' to define a dividing section at the front of the gathering zone, and it will be apparent that the dividers will align the cans in the lanes between them into straight files as those cans are carried forwardly by the conveyor.

Spanning the space between the front end of the medial belt stretch 14' and the rear end of the front belt stretch 15' is a short stationary plate 21 across which the cans travel, but since the length of this plate (measured in the direction of conveyor travel) is substantially less than twice the diameter of a can, each can will be moved across the plate by the pressure of the cans in the file behind it as the latter are urged forwardly by the medial belt 14.

Figure 7:
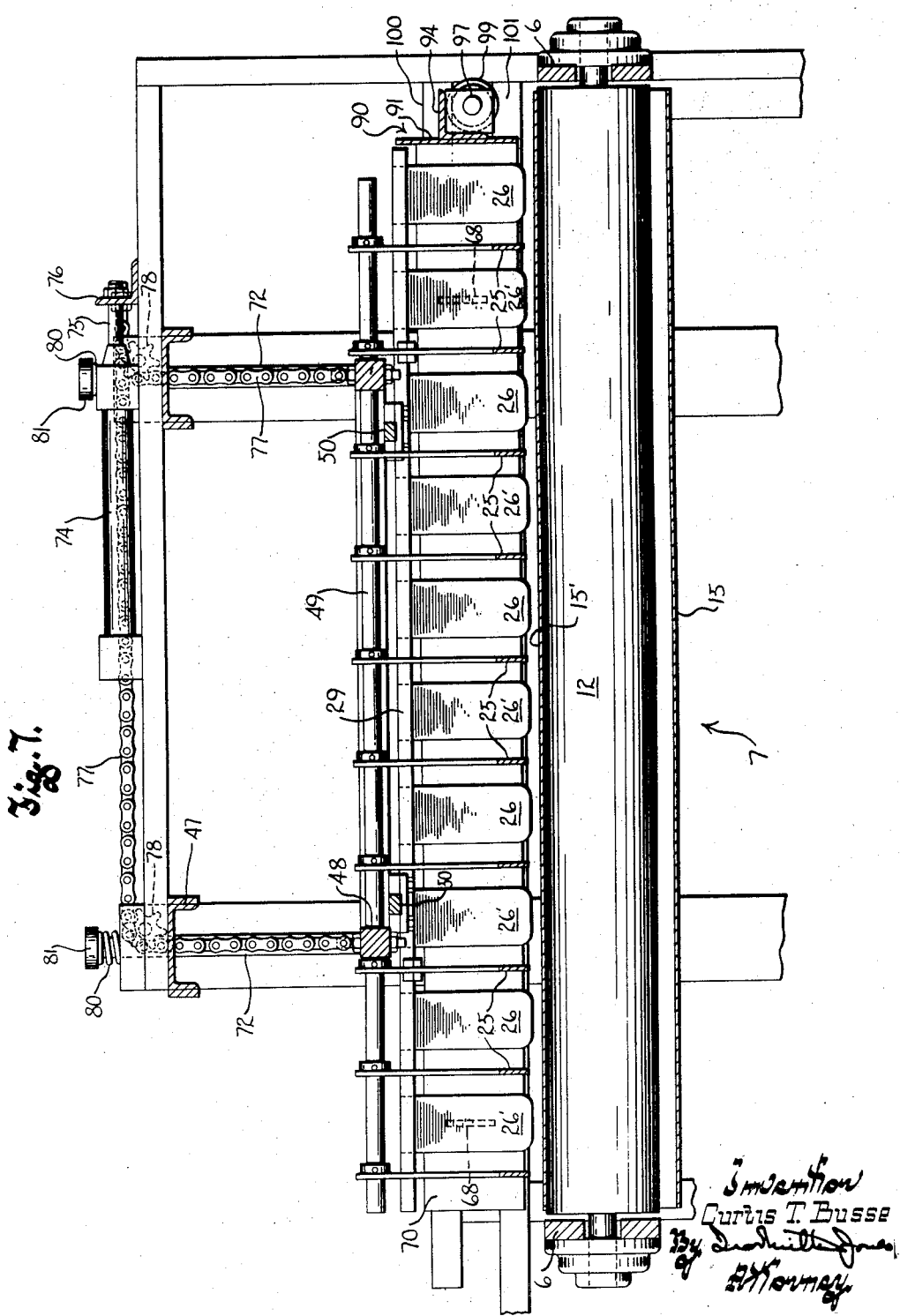
Figure 7 is a transverse sectional view taken on the plane of the line 7—7 in Figure 2.

After the cans move across the plate 21, onto the front belt 15 and into the patterning zone, they are again confined between dividers 25, the latter being lengthwise aligned with, and endwise adjacent to, the dividers 18 in the gathering zone, and by them the cans in the patterning zone are kept in the files into which they were organized in the gathering zone. The cans move forwardly on the front belt 15, in the lanes between the dividers 25, until the front can in each file encounters an abutment finger 26 or 26' near the front of the lane along which it is proceeding; and the engagement of the front can with the abutment finger stops it and the whole file of cans behind it, even though the belt 15 continues to move. As best seen in Figure 7, there is an abutment finger in each lane between dividers 25, and the abutment fingers 26 in alternate lanes project downwardly from the rear of a front stop bar 28, while the fingers 26' in the remaining lanes project downwardly from the front of a rear stop bar 29.

The two stop bars 28 and 29 are mounted (as hereinafter described) for movement between rearward and forward defined positions. In the rear positions of the stop bars 28 and 29 (illustrated in Figures 1 and 2) the fingers 26 and 26' which they respectively carry are in lateral alignment with one another across the width of the patterning zone; hence when the stop bars are in their rearward positions and the front cans in all of the files of cans engage the fingers, those cans will be held in a straight rank. Similarly, as the belts 14 and 15 urge the cans in each lane forwardly, into contact with the cans ahead of them, all of the cans in the patterning zone and at the front of the gathering zone will be held in straight ranks.

Figure 9:
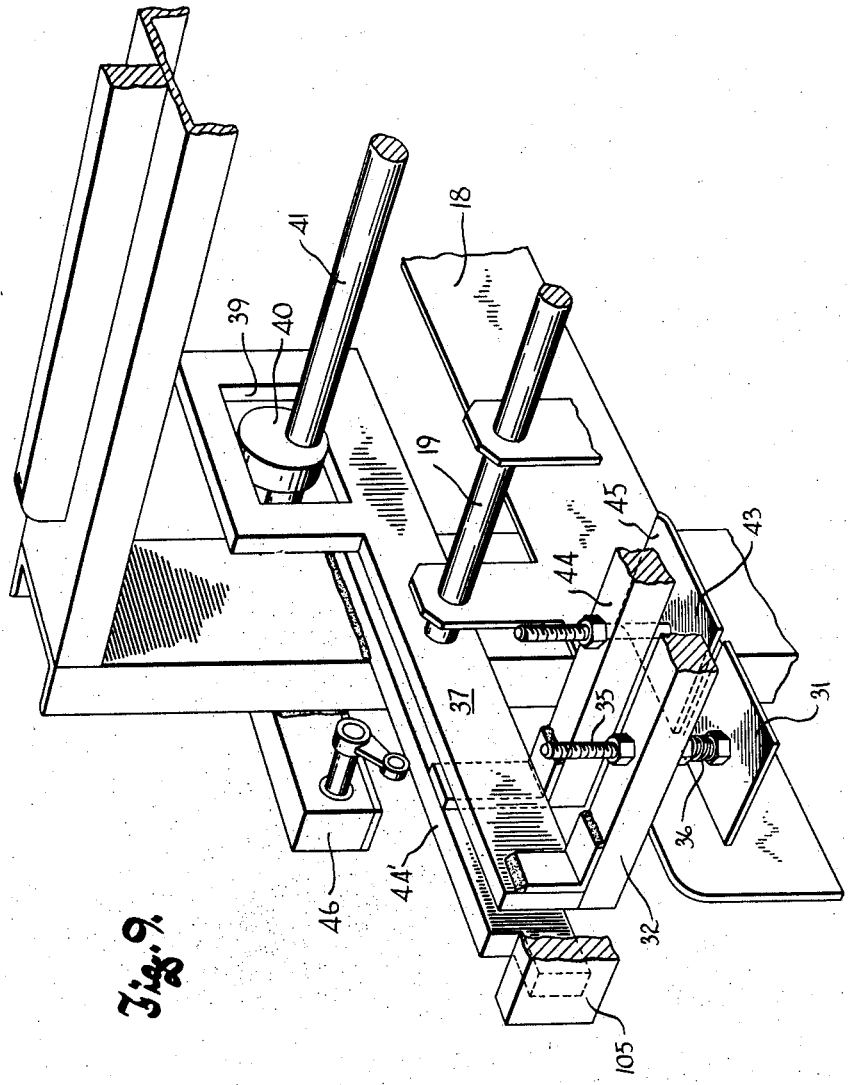
Figure 9 is a fragmentary perspective view of a portion of the clamping shoe mechanism, showing the means by which the same is actuated.

When the patterning zone is filled with cans, the front rank of cans in the gathering zone is temporarily confined against forward movement by means of clamping shoes 31, one such shoe being mounted in each lane at the front of the gathering zone and each being adapted to releasably clamp a can downwardly against the stationary plate 21. The several clamping shoes can be raised and lowered in unison by reason of the fact that they are all carried by a clamp bar 32 that extends across the conveyor. Each of the clamping shoes is also permitted to have limited independent up and down movement in the clamping bar, and is biased downwardly relative to the clamping bar, to insure that each can in the front rank in the gathering zone will be securely clamped against the plate 21 whenever the clamping bar is moved down, regardless of slight variations in the heights of the cans or irregularities in the surface of plate 21. To this end (see Figure 9) each shoe is fixed to the bottom of an upright stem 35 which extends axially slidably through the clamping bar, and a compression spring 36 surrounds the stem and reacts between the shoe and the clamping bar.

The clamping bar is mounted for up and down motion on the front ends of a pair of arms 37, one at each side of the machine, which are medially pivotally mounted on the front supporting rod 19. At its rear each of the arms has a cam slot 39 in which is engaged an eccentric 40 whereby the front ends of the arms may be rocked up and down to raise and lower the clamping bar. The eccentrics are fixed to a common rock shaft 41 which is rotatably supported on the frame of the machine and which has a manually actuatable crank arm 42 connected to the end thereof which is adjacent to the operator's position 11, to enable an operator to raise and lower the clamping shoes.

To insure that cans moving into the space below the clamping shoes will be in squarely upright position, a stationary guide shoe 43 is mounted behind each clamping shoe. The guide shoes are mounted on a bar 44 that extends across the conveyor, above the same, and that has its opposite ends fixed to stationary brackets 44' on the frame. Each guide shoe is held spaced above the conveyor a distance slightly greater than the height of a can, and it has an upwardly curved rear edge portion 45 by which the top of a can passing thereunder is cammingly engaged to settle the can squarely on its bottom as it moves onto plate 21.

When the clamping shoes are raised and cans from the gathering zone are being transferred to the patterning zone, it is desirable to insure that the cans in the lanes between dividers will be moved into close fore-and-aft contact with one another and that every lane will be filled along its entire length. For this reason the belt 14 at the front of the gathering zone is speeded up whenever the clamping shoes are in their raised positions. A double throw switch 46, connected with the motor 23 which drives the belt 14, is mounted above one of the arms 37 to have its actuator engaged by said arm when the same is swung up. The switch actuator is biased to a position corresponding to the lower speed of the motor 23, and the arm, when raised, throws the switch actuator to its higher speed position. The belt 15 in the patterning zone is started simultaneously with speeding up of belt 14, and for this reason the switch 46 may be a double pole switch, or, alternatively, a second switch may be provided over the other arm 37, to control the motor 24 which drives belt 15.

When the clamping shoes are engaged, the cans in the patterning zone are moved forwardly a short distance, to space the rear rank of cans in the patterning zone from the front rank of cans in the gathering zone, and also to stagger the files of cans in the patterning zone and thus dispose the cans in the desired compact honeycomb pattern. Such limited forward movement of the cans in the patterning zone is provided for when the two stop bars 28 and 29, and the abutment fingers 26 and 26' carried by them, move to their forward positions. The mounting means for bars 28 and 29, and also for the dividers 25, comprises an elevated stationary frame 47 fixed over the patterning zone of the machine and which supports therebeneath a vertically movable elevator frame 48 by which the stop bars and dividers may be raised and lowered. Spaced apart front and rear rods 49 fixed in the elevator frame and extending transversely across the conveyor support the dividers 25. Extending rearwardly from the front stop bar 28 are a pair of rails 50 which are endwise slidably carried by the elevator frame 48 to mount the stop bar for back and forth motion. The rear stop bar 29 rests on short rails 51 that project rearwardly from the front stop bar, and in addition to being moved with the front stop bar the rear stop bar may have limited back and forth sliding motion on these rails relative to the front stop bar.

The front stop bar (and with it, of course, the rear stop bar) is biased forwardly by means of a pair of coiled tension springs 52, each overlying one of the rails 50 and connected between an eye 53 fixed on the rail it overlies, near the rear thereof, and the front rod 49.

The stop bars may be releasably locked against forward movement in response to the bias of tension springs 52 by means of a latch arm 55, the hooked front end of which is engageable over a keeper bar 56 bridging the rails 50 near the rear thereof. A transverse pintle 57, carried by a bracket 58 fixed to the elevator frame, extends through the rear of the latch arm to mount the same for up and down swinging movement of its hooked front end to and from its keeper engaging position. A spring 60 biases the latch arm downwardly to insure that it will have secure engagement with its keeper.

To permit the stop bars to move forwardly, in response to the bias of springs 52, substantially simultaneously with application of the clamping shoes, the latch arm may be raised by means of a cable 63 connected between the latch arm and an arm 64 freely swingably mounted on the rock shaft. Downward swinging motion may be imparted to arm 64 to tension the cable 63 by means of an actuating arm 65 anchored to the rock shaft adjacent to the freely swingable arm and having near its free end a pin 66 that projects laterally into the path of swinging motion of the arm 64. The actuating arm 65 swings its pin 66 downwardly against the freely swingable arm 64 when the rock shaft is rotated to and slightly beyond its position corresponding to full lowering of the clamping shoes 31. The cable is trained over pulleys 67 mounted above the latch arm, on the fixed upper frame 47, so that tensioning of the cable exerts an upward pull on the latch arm.

Figure 3:
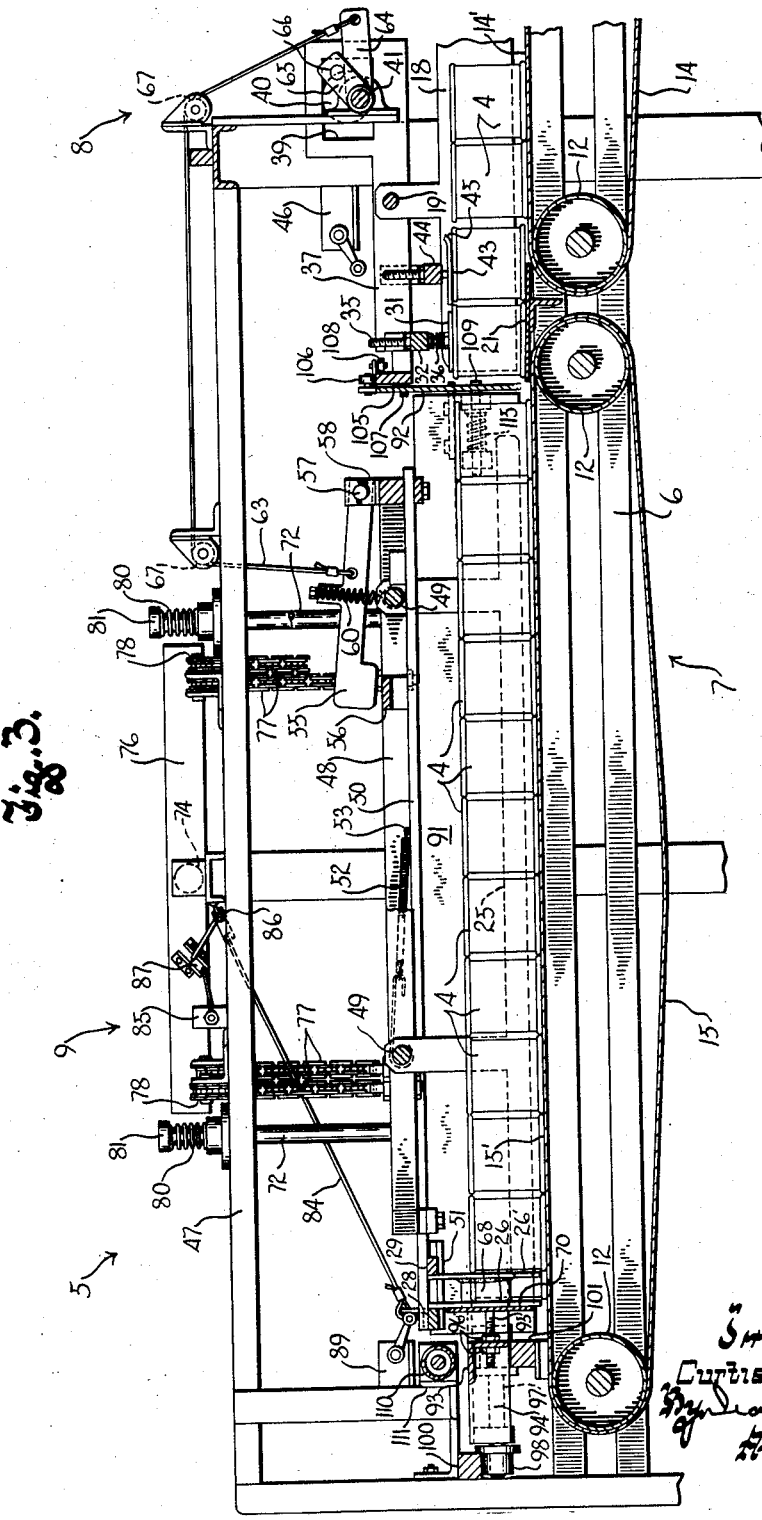
Figure 3 is a view substantially similar to Figure 2 but showing the machine with cans in the patterning zone disposed in alternate staggered files.
Figure 4:
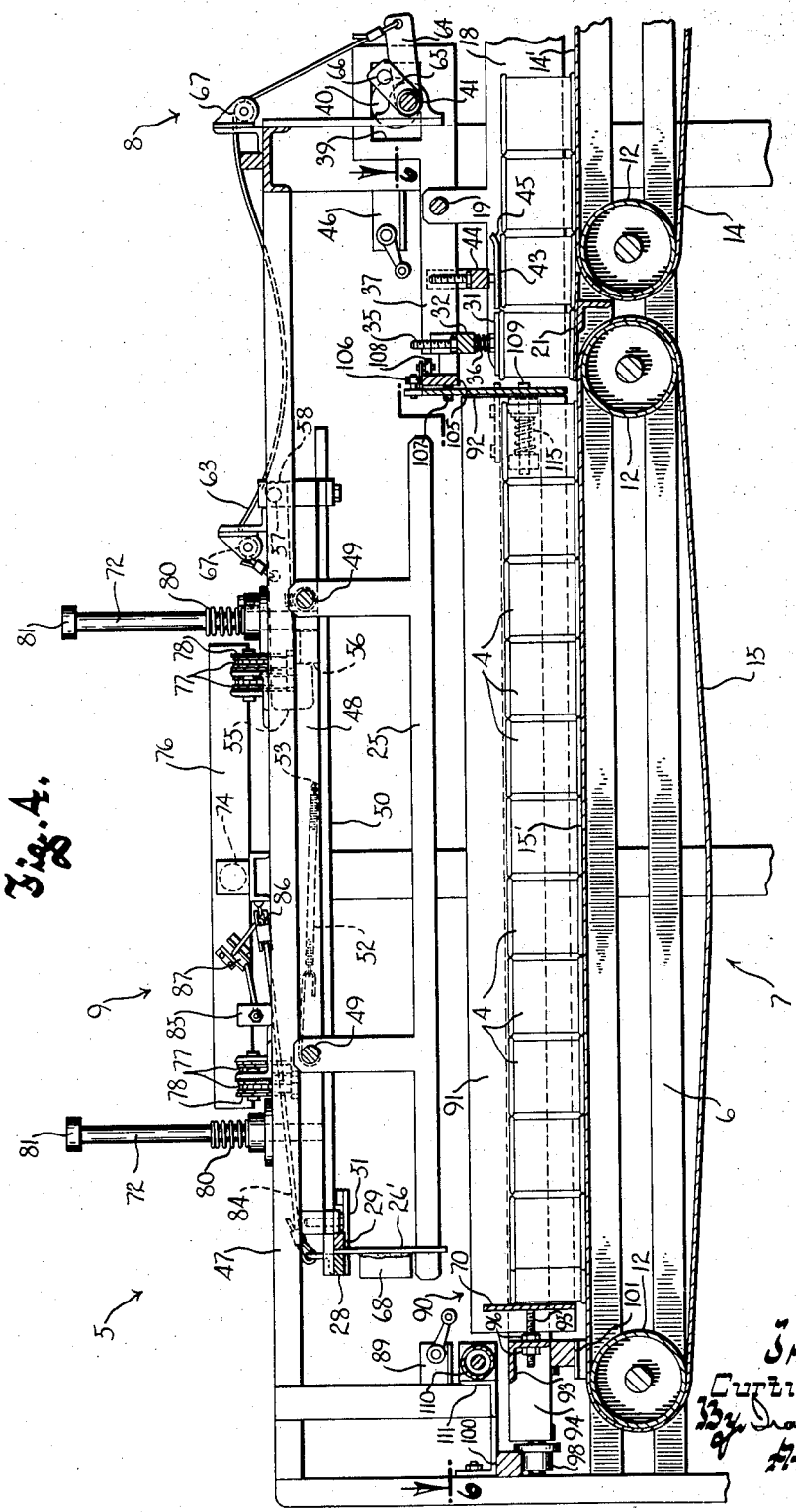
Figure 4 is a view similar to Figures 2 and 3 but showing the dividers and stop abutments raised above the cans in the patterning zone so that said cans may be swept into the pallet zone.

When the latch is thus released and the two stop bars 28 and 29 move forwardly in response to the bias of the tension springs 52, the rear stop bar 29, and the abutment fingers 26' carried thereby, are stopped half a can diameter rearwardly of the fingers 26 on front bar 28 (see Figures 3, 5 and 7), so that the files of cans in the patterning section, pushed up against the fingers 26 and 26', will be staggered and preliminarily disposed in a loose honeycomb arrangement. The rear stop bar is stopped in such rearwardly spaced relation to the front one because certain of its abutment fingers 26' have spacing bumpers 68 projecting from their front faces and engageable with a front wall member 70 to hold the fingers 26' in the forward position just described.

Figure 8:
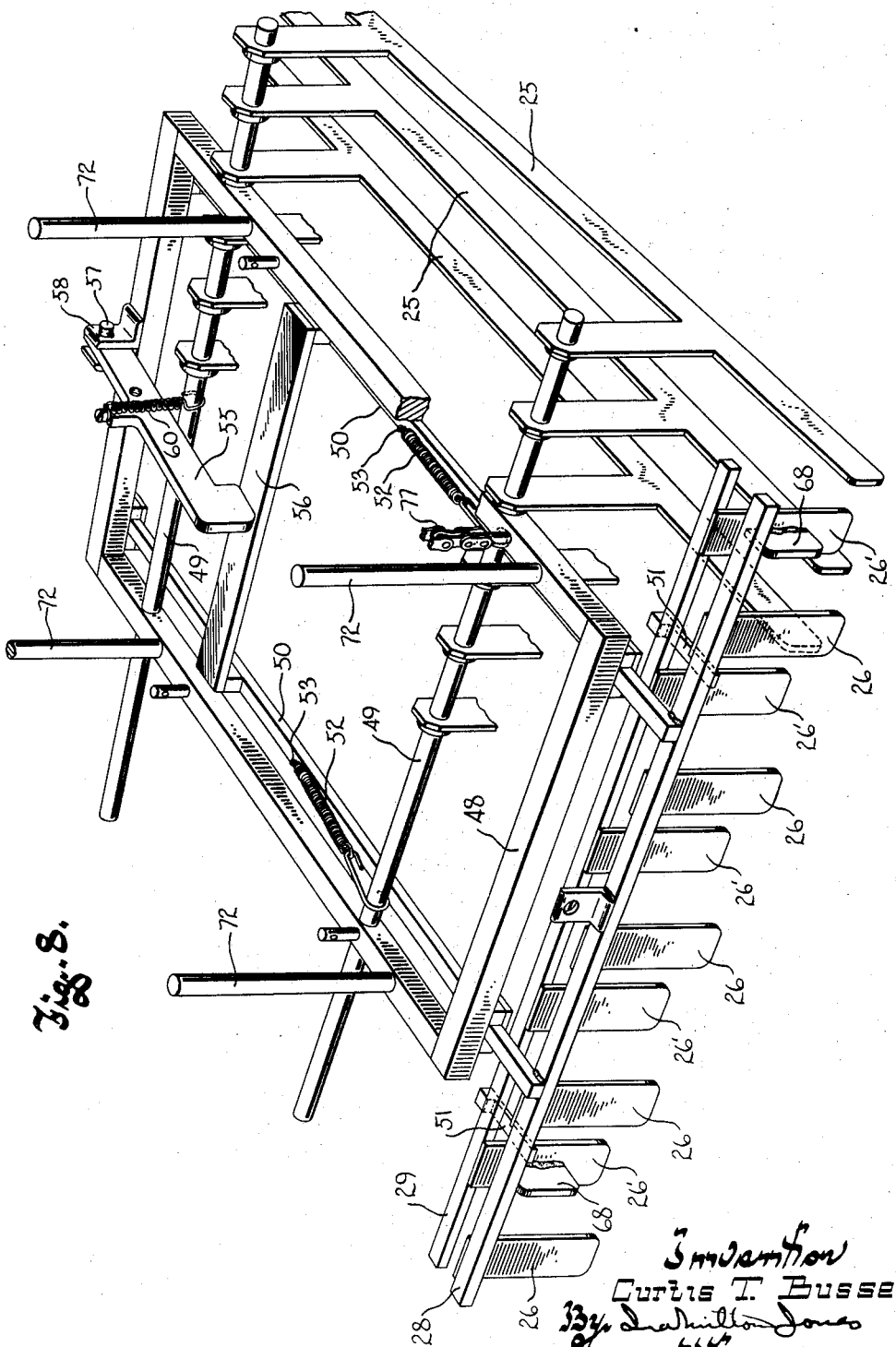
Figure 8 is a fragmentary perspective view showing the elevatable mechanism in the patterning zone.

After the cans in the patterning section have thus been preliminarily formed into the desired relationship, the elevator frame 48, which carries the dividers 25 and abutment fingers 26 and 26' is raised to lift the dividers 25 and the abutment fingers 26 and 26' above the tops of the cans, and the cans are then collectively swept laterally off of the conveyor and into the pallet zone. The elevator frame is guided for up and down motion by means of four posts 72 projecting upwardly from it and axially slidable in vertical bores in the upper fixed frame 47. The elevator frame is raised and lowered by means of a hydraulic cylinder 74 mounted on the upper fixed frame and having its ram 75 extensible horizontally, transversely to the direction of conveyor travel, and attached at its outer end to a beam 76. (See Figures 5 and 8.) Laterally outward movement of beam 76 upon extension of hydraulic ram 75 is translated into raising of the elevator frame by means of four chains 77, each connected at one end to the elevator frame, near one of the posts 72, and connected at its other end to the beam 76, and each trained over a sprocket 78 that is freely rotatably mounted on the upper frame.

The hydraulic cylinder 74 may be of the single acting type, and to prevent the elevator frame and the members carried thereby from slamming down abruptly when hydraulic pressure is taken off the cylinder, each of the posts 72 has a compression spring 80 surrounding its upper end portion and confined between a collar 81 fixed to the upper end of the post and the upper fixed frame.

When the elevator frame is raised, the stop bars 28 and 29 are drawn back to their rearward positions, against the bias of tension springs 52, by means of a cable 84 connected at one end to the front stop bar 28 and at its other end to a bracket 85 on the upper fixed frame, and trained over a freely rotatable pulley 86 on the upper frame and another pulley 87 on the beam 76 whereby the cable is tensioned upon outward movement of the beam. As the front stop bar is drawn rearwardly in consequence of tensioning of the cable 84, the keeper 56 cams its way under the latch arm 55 and is engaged by the hooked front end of the latch arm to be releasably held thereby. Although the clamping shoes will be engaged at this time, and the freely swingable arm 64 will therefore be held in its cable tensioning position by actuating arm 65, the latch cable 63 will nevertheless be slack because of the elevation of the latch mechanism along with the elevator frame, and the latch arm will be able to swing downwardly over the keeper to its engaged position. The spring 60 insures that the freely swingable arm 64 will not overbalance the latch arm, through cable 63, and hold the latch arm in its raised position.

When cable 84 is tensioned and draws the front stop bar to its rearward position, the rear stop bar 29 will be near the rear ends of the short rails 51 on which it rides, spaced rearwardly from the front bar, but as cans entering the patterning zone engage the stop fingers 26' they will move the rear bar toward the front bar until the fingers 26' are aligned with the fingers 26.

When the stop bars 28 and 29 have moved to their forward positions and the desired arrangement of cans has been formed in the patterning section, the front belt 15 should be stopped, so that it will not interfere with sideward movement of cans onto a pallet 88 in the pallet zone. A normally closed switch 89 is fixed at the front of the machine with its actuator projecting rearwardly to be engaged by the front stop bar 28 as the latter moves forwardly, and this switch is so connected with the drive motor 24 for the front belt 15 and the drive motor 23 for the medial belt 14 that actuation of said switch by the front stop bar stops the front belt 15 and reduces the speed of medial belt 14 to its normal rate. There will normally be some coasting or overtravel of the belt 15 which will insure that all of the cans in the patterning zone will be carried into longitudinally compacted files before the belt stops, and it will be understood that the tension springs 52 are relatively weak so that the stop bars will not be moved forwardly at a speed substantially faster than that of the cans.

Figure 6:
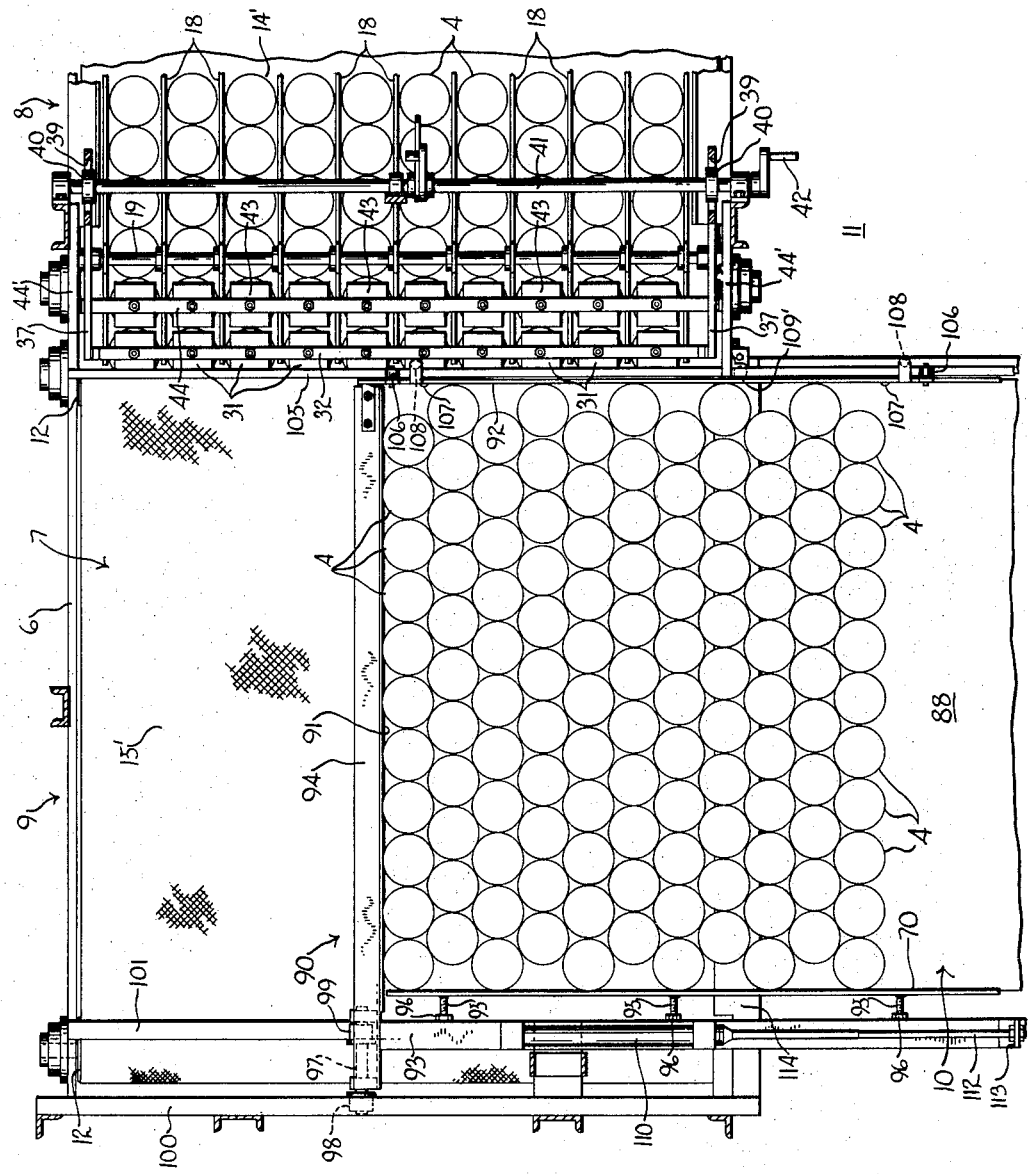
Figure 6 is a horizontal sectional view taken on the line 6—6 in Figure 4, and showing a group of cans partially swept from the patterning zone into the pallet zone.

The cans gathered in the patterning zone are moved into the pallet zone by means of a three-sided substantially U-shaped sweep designated generally by 90 which embraces the cans to prevent disruption of their pattern, and which, as best seen in Figure 6, comprises the front wall member 70, a side wall member 91 and a gate-like rear wall member 92. The front and side wall members 70 and 91 of the sweep are mounted on a substantially L-shaped carriage frame comprising an angle beam 93 extending across the conveyor near the front thereof, and another angle beam 94 extending lengthwise of the conveyor and normally disposed at the edge thereof remote from the pallet zone. The beam 94 projects forwardly of the beam 93 a short distance, and said two beams are rigidly connected at their junction, as by welding. The side wall member 91 is rigidly secured, as by welding, to the inner face of the lengthwise extending beam 94. A plurality of threaded studs 95, welded or otherwise permanently secured to the front wall member 70, project forwardly therefrom through holes in the transverse beam 93, and nuts 96 on said studs at both sides of said beam secure the front wall member 70 to said beam in a manner providing for adjusting back and forth movement of the front wall member relative to the carriage.

Beneath the forwardly projecting end portion of the lengthwise extending beam 94 is mounted a short shaft 97, the axis of which extends parallel to the length of said beam. Freely rotatable on this shaft are front and rear flanged rollers 98 and 99. The front roller 98 rides on the underside of a fixed front rail 100 which extends across the conveyor, and the rear roller 99 rides on the upper surface of a fixed rear rail 101 which is longer than the front rail 100 and extends parallel to the front rail across the conveyor and the pallet zone.

Beneath the transverse beam 93, at the end thereof adjacent to the pallet, is mounted another shaft 103 (see Fig. 5) upon which is rotatably journaled a supporting roller 104 that rides on the upper surface of the longer fixed rail 101. It will be seen that the carriage is substantially cantilevered upon the rollers 98 and 99, and is steadied by the roller 104, and the flanges on rollers 98 and 99 cooperate with the opposing faces of the rails to prevent fore and aft movement of the carriage.

Figure 5:
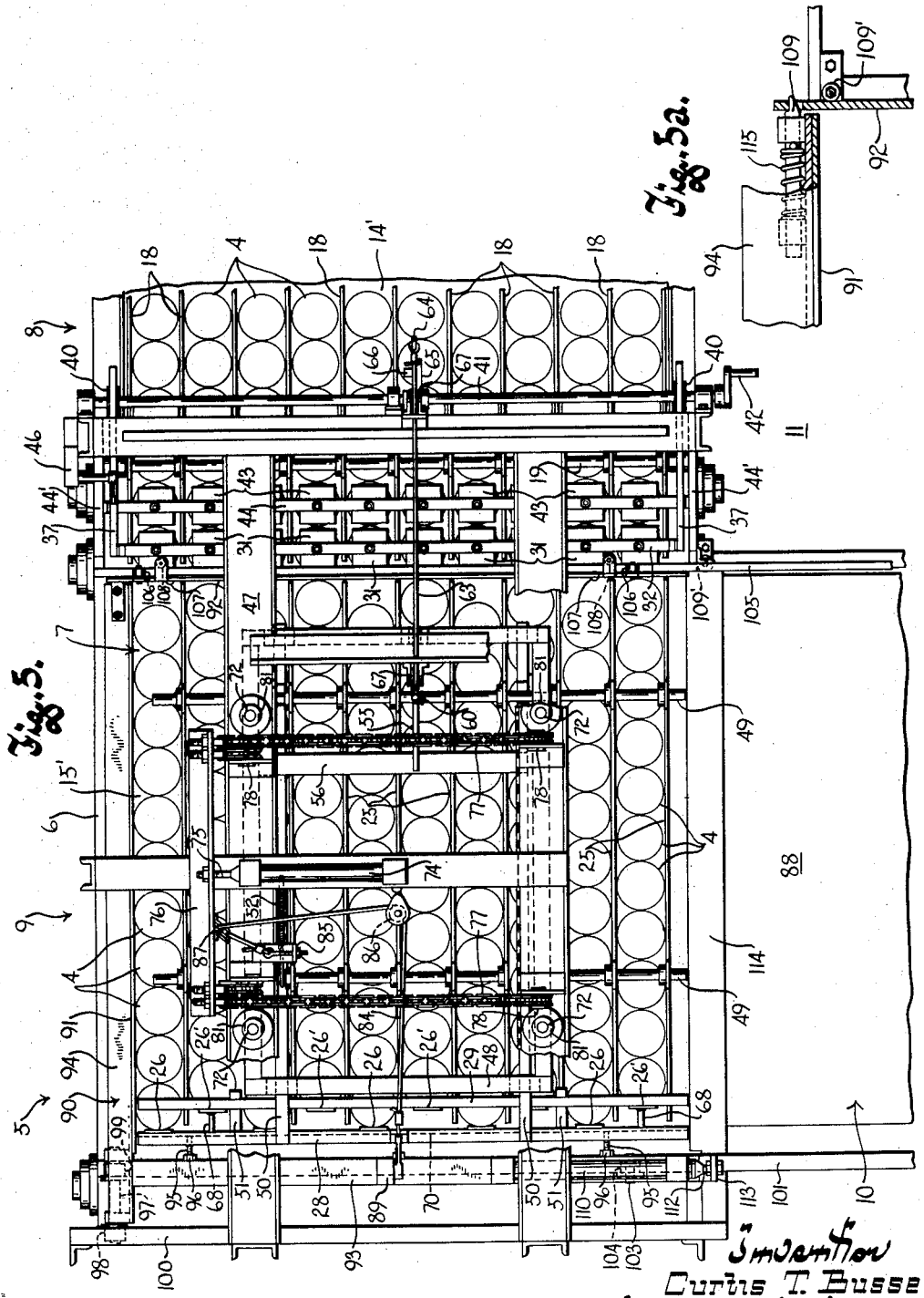
Figure 5 is a plan view of the patterning zone and the front part of the gathering zone of the machine, with parts broken away, showing the cans in the arrangement illustrated in Figure 3.

The gate-like rear wall member 92 is endwise movable relative to the other two wall members 70 and 91 comprising the sweep, so that when the front and side wall members return to their normal positions illustrated in Figures 1 and 5, in which the side wall member 91 is located at the side of the conveyor remote from the pallet zone, the gate-like rear wall member 70 can remain at the rear of the pallet zone, in the position shown in Figure 1, where it will not interfere with movement of cans from the gathering section into the patterning section.

The gate-like rear wall member is mounted for endwise movement upon a track 105 fixed to the frame and extending across the conveyor at the rear end of the pallet zone at a sufficient height above the belt stretch 15' so as not to interfere with cans moving along the belt. The rear wall member has rollers 106 mounted thereon that ride on top of the track 105, and also has guide rollers 107 and 108 which engage the front and rear faces of the track to confine the wall member to lengthwise motion.

When a preliminary pattern of cans has been formed in the patterning zone, the gate-like rear wall member 92 is manually moved end-wise out of its normal position behind the pallet zone and into the space between the rear rank of cans in the patterning zone and the rank of cans confined under the clamping shoes at the front of the gathering zone. When the rear wall member is moved into engagement with the side wall member 91 a latch pin 109 on the side wall member engages, under axial biasing force of a compression spring 115, in a closely fitting aperture in the rear wall member, thus establishing a readily releasable connection between said wall members whereby the rear wall member is constrained to move as a part of the U-shaped sweep until the sweep has moved entirely across the conveyor. Then a roller 109' engages the pin 109 to push it out of the aperture in the rear wall member so that the front and side wall members 70 and 91 can return to their original positions while the rear wall member stays in its normal position behind the pallet zone.

The U-shaped sweep is actuated for movement across the conveyor by means of a hydraulic cylinder 110 mounted at the front of the machine, on a bracket 111 fixed above the front of the conveyor. The outer end of the ram 112 of this hydraulic cylinder is rigidly connected to a bracket 113 fixed on the transverse carriage beam 93 so that extension of the ram moves the sweep toward the pallet and the rigid connection between the ram 112 and the beam 93 steadies the latter and cooperates with rollers 98, 99 and 104 to confine the L-shaped carriage to linear motion along rails 100 and 101. The hydraulic cylinder 110 may be manually controlled from the operator's position, or it may be controlled automatically by suitable means synchronized with the elevator cylinder ram.

Before the sweep begins moving toward the pallet zone, the dividers 25 and stop fingers 26 and 26' are of course raised to clear the cans, as hereinbefore described; and as the sweep begins to move it first moves the cans in the files remote from the pallet zone into engagement with the cans in their neighboring files, filling the spaces left by the raised dividers and compacting the pattern of cans in the patterning zone. As the cans are moved into the pallet zone they cross a stationary plate 114 adjacent to the top stretch of belt 15 and which spans the gap between the belt and the pallet to provide for smooth movement of cans thereacross.

The mechanism in the pallet zone may be an ordinary fork lift truck hoist comprising a hydraulic cylinder 116, the ram 117 of which is extensible upwardly and carries a fork 118 adapted to engage under a pallet 88 to lift the same.

Initially the pallet is raised substantially to the level of belt stretch 15' to receive the first layer of cans formed by the machine. While the next batch of cans is being assembled in the patterning zone, the operator lowers the pallet by a distance equal to the height of a can and places a sheet of paper 120 or other layer separator over the layer of cans just deposited thereon. The pallet is then ready to receive the next layer of cans, which is, of course, deposited directly over the first.

By means of the modified embodiment of the machine of this invention illustrated in Figures 12 and 13, alternate files in the patterning zone are provided with one can more than the remaining files, but of course all of the alternate files have the same number of cans. Preferably this arrangement is used with an odd number of files, and with longer files at the outside of the pattern, so that there is a can 4' at each corner of the pattern. This arrangement makes for tighter and more stable packaging when the stacked layers of cans are wrapped in paper, the cans 4' at the corners insuring substantially square sides to the package.

To accomplish this staggered arrangement of longer and shorter files, the rear stop bar 129 is mounted on elongated rails 50' which are endwise slidably mounted in the vertically movable elevator frame 48, while the front stop bar 128 is mounted for back and forth sliding motion relative to the rear stop bar on short rails 151 which project forwardly from the rear stop bar. The abutment fingers 126 and 126' project down from the remote sides of stop bars 128 and 129 respectively, and in the rearward positions of said bars each of the fingers 126' is spaced a full can diameter rearwardly of the laterally adjacent fingers 126, so that the alternate files of cans behind fingers 126' will each be shorter by one can than the remaining files behind fingers 126. When the stop bars move forwardly, after the clamping shoes are engaged, the front stop bar moves relatively toward the rear one by a distance equal to half a can diameter, being stopped in engagement with the rear stop bar, and the several files of cans in the patterning zone are thus disposed in a preliminary honeycomb arrangement. In other respects the machine shown in Figures 12 and 13 is the same as that previously described.

To briefly summarize the operation of the machine, cylindrical cans (or other articles) of uniform height and diameter are placed on the belt 13 at the rear of the machine with their axes upright. As they move forwardly through the gathering zone they are distributed uniformly across the width of the conveyor by the spreaders 16 and 16', and then they are aligned into straight files by the fixed dividers 18. The first batch of cans entering the machine is permitted to continue on into the patterning zone, where the elevatable dividers 25 hold them in the files into which they were organized in the gathering zone. Forward travel of the cans is halted by the engagement of the front cans in each file with stop fingers 26 and 26' which, being in their rearward positions, dispose all of the cans in the patterning zone and at the front of the gathering zone in transversely aligned ranks.

During the part of the cycle described above, the clamping shoes are of course raised to permit the cans to pass from the gathering zone to the patterning zone, the belt 15 in the patterning zone is moving, the belt 13 is moving at normal speed (as it does all during operation of the machine), and the belt 14 is moving at twice normal speed.

When the patterning zone is filled with cans, the clamping shoes are lowered to confine the front rank of cans in the gathering zone against forward motion. Substantially simultaneously the latch arm 55 is raised, permitting the abutment bars 28 and 29 to move forwardly in response to the bias of springs 52, and the cans in the patterning zone move forwardly to leave a space between the rearmost cans in the patterning zone and the clampingly confined front rank of cans in the gathering zone. Forward movement of the abutment bars 28 and 29 also effects staggering of the files of cans in the patterning zone because the alternate fingers 26' are stopped half a can diameter behind the other fingers 26.

Upon lowering of the clamping shoes, the belt 14 in the gathering zone slows down to normal speed, at which its top stretch 14' moves at the same rate as belt stretches 13' and 15'. The belt 15 in the patterning zone will continue to move after the clamping shoes are lowered, carrying the cans in said zone forwardly in unison with forward movement of the abutment bars 28 and 29, until the abutment bars reach their forward positions when they will actuate the switch 89, stopping the belt 15.

As soon as the cans in the patterning zone have moved forwardly away from the cans under the clamping shoes, the operator moves the gate-like rear wall member 92 from its normal position behind the pallet zone, across the conveyor, into engagement with the side wall member 91, placing the rear wall member in position to function as part of the U-shaped sweep.

When the patterning zone belt 15 stops, the operator actuates the control for the elevator cylinder 74, raising the dividers 25 and abutment fingers 26 and 26' to their elevated positions in which they are above the tops of the cans, and immediately thereafter the sweep is moved transversely across the belt, toward the pallet zone. During the first part of its motion the sweep compacts the pattern of cans, forming them into the desired honeycomb pattern in which every can is in contact with all of its adjacent cans; and during the remainder of its travel the sweep moves the compacted pattern of cans onto the pallet. As the front and side wall members move back from the pallet zone to their original positions, the gate-like rear wall member 92 remains behind in its normal position at the rear of the pallet zone.

The pallet is lowered by substantially the height of a can, to place it in position to receive the next layer of cans, and a sheet of paper, or other layer divider is placed over the layer of cans just deposited. When the front and side wall members have returned to their normal positions, the dividers 25 and stop fingers 26 and 26' are lowered. The fingers 26 and 26' are now back in their rearward positions, having been drawn thereto by cable 84 during the last part of the lifting movement of the elevator frame. With the elevator frame lowered, the clamping shoes may be raised. The patterning zone belt 15 will again begin to move, and the gathering zone belt 14 will speed up to its faster rate, cans will begin moving into the patterning zone, and the cycle will be repeated.

From the foregoing description taken together with the accompanying drawings it will be apparent that this invention provides a machine for arranging upright cylindrical cans or similar articles into a compact honeycomb pattern in which the cans are arranged in straight laterally adjacent files, with the cans in each file displaced half a diameter lengthwise of the file relative to the cans in the adjacent files on each side of them. It will also be apparent that this invention provides a dependable, efficient and largely automatic machine adapted to receive cans from a can making machine or other source and to arrange them in rectangular groups having a honeycomb pattern, and to pile such groups in vertically superimposed relation to form a stack having rectangular sides and which may be easily wrapped in paper and stored and transported on a fork lift truck pallet.

What is claimed as my invention is:

1. In a machine for arranging upright cylindrical containers in a compact rectangular pattern of straight laterally adjacent files with the containers in alternate files displaced half a diameter in one direction lengthwise of the files out of lateral alignment with the containers in the remaining files: an elongated supporting frame; a conveyor mounted on said frame and having a straight substantially horizontal stretch extending longitudinally of the frame, upon which upright cylindrical containers may be carried; means for driving said conveyor to move said stretch thereof forwardly; longitudinal divider means mounted on the frame for vertical movement to an inoperative position vertically spaced from the conveyor into an operative position adjacent to said stretch of the conveyor and at which the divider means define lanes in which containers carried by the conveyor may be held in straight files; two sets of stops mounted on the frame for up and down movement to an inoperative position vertically spaced from said stretch of the conveyor and to an operative position adjacent to said stretch of the conveyor and in which the stops are disposed in the front portion of each lane, the stops of one set being disposed in alternate lanes and aligned with one another across the conveyor, and the stops of the other set being disposed in the remaining lanes, aligned with one another across the conveyor, and movable back and forth relative to the stops of the first set between defined rearward and forward limits, at the forward one of which the stops of said other set are displaced half a container diameter out of alignment with the stops of said one set, all of said stops being engageable by containers carried along the lanes by the conveyor to align the containers in straight ranks across the conveyor when the stops of said other set are at their rearward limits and to stagger the files of containers when the stops of said other set are at their forward limits; and means on the frame for vertically moving said stops and the divider means to the inoperative position removed from containers on the conveyor to permit containers filling said lanes and positioned in staggered files by the stops to be moved laterally off of the conveyor.

2. In a machine for arranging upright cylindrical containers in a compact rectangular pattern of straight laterally adjacent files, with the containers in alternate files displaced half a diameter in one direction lengthwise of the files out of lateral alignment with the containers in the remaining files: an elongated supporting frame; conveyor means mounted on the frame and upon which upright cylindrical containers may be carried, said conveyor means extending longitudinally of the frame respectively through a gathering zone and a patterning zone forwardly adjacent to the gathering zone; means for driving the conveyor means forwardly; a plurality of elongated laterally spaced apart dividers fixed on the frame in the gathering zone and extending lengthwise thereof for aligning containers in the gathering zone into straight files; vertically movable divider means mounted on the frame for movement to an inoperative position vertically spaced from the patterning zone and to an operative position in the patterning zone at which the divider means are lengthwise aligned with and closely adjacent to the divider means in the gathering zone and define lanes in which containers carried by the conveyor means may be retained in said straight files; means on the frame providing abutments in the patterning zone, near the front thereof, which are arranged to be engaged by the front container in each lane and are adapted to define the forward limits of travel of the containers in the patterning zone, said abutments being so located that containers in alternate lanes are disposed half a container diameter forwardly of the containers in the remaining lanes; restraining means on the frame at the front of the gathering zone releasably engageable with containers behind those in the patterning zone to preclude transfer of more than a predetermined number of containers in each file from the gathering to the patterning zones; and means for vertically moving said raised divider means to their raised inoperative position to permit containers in the patterning zone to be swept laterally off of the conveyor means without disruption of the arrangement into which said containers have been organized by said divider means and said abutment means.

3. Apparatus for arranging upright cylindrical cans in a compact rectangular pattern suitable for a pallet, with the cans aligned in adjacent straight files and with alternate files of cans displaced half a can diameter lengthwise of the files relative to the remaining files, said apparatus comprising: an elongated frame; conveyor means on the frame adapted to carry upright cylindrical cans and movable longitudinally of the frame; means for driving said conveyor means forwardly through a gathering zone and a patterning zone forwardly adjacent to the gathering zone; means on the frame providing a plurality of laterally spaced apart fixed dividers extending in the direction of conveyor travel through the front of the gathering zone and defining lanes in which cans moved forwardly by the conveyor are held in straight files; means on the frame providing elevatable dividers movable vertically to an inoperative position remote from the patterning zone and to an operative position in the patterning zone, lengthwise aligned with and adjacent to the fixed dividers and defining lanes substantially continuous with those defined by the fixed dividers; means providing an abutment in each lane engageable with a can at the front of a file of cans moving along the lane; means on the frame mounting said abutment means for vertical movement to an inoperative position remote from the patterning zone and to an operative position in the patterning zone and in which the abutments are movable to a rearward location near the front of the patterning zone, wherein the abutments hold cans in the patterning zone in straight ranks, and to a forward location, farther forward in the patterning zone, in which the abutments in alternate lanes are spaced half a can diameter forwardly of the remaining abutments so that cans in files behind said abutments are correspondingly staggered; means on the frame at the front of the gathering zone for temporarily halting movement of cans through the gathering zone at times when said abutments are out of their rearward locations; control means connected with said conveyor drive means for stopping movement of said conveyor means through the patterning zone after said abutments have moved to their forward locations, so that cans in the patterning zone can be stopped in lengthwise staggered files; means for vertically moving said elevatable dividers and the fixed abutment means to their inoperative positions; and means providing a substantially U-shaped sweep having its open side at one side of the conveyor means and mounted on the frame for movement across the conveyor means, toward its open side, to carry staggered files of cans in the patterning zone off of the conveyor means without disturbing their arrangement.

4. In a machine of the character described: an elongated frame; a first conveyor mounted on the frame for movement lengthwise thereof and adapted to carry upright cylindrical cans; means for driving said first conveyor forwardly along the frame; divider means on the frame above the first conveyor and cooperable therewith for aligning upright cylindrical cans on the first conveyor into straight laterally adjacent files extending lengthwise of the frame; retarding means on the frame, at the front of the first conveyor, releasably engageable with a can in each file to releasably hold the same against movement with the first conveyor, so that cans in the file behind said one can are carried by the first conveyor into contacting engagement with one another along the length of the file, said retarding means being so aligned across the frame that the cans behind those held thereby form laterally aligned ranks as they are moved forwardly into contact with one another by the first conveyor; means including a second conveyor on the frame, lengthwise aligned with and forwardly adjacent to the first, for receiving cans from the first conveyor; means for driving said second conveyor forwardly whereby relative separating motion can be effected between a group of aligned ranks of cans on said second conveyor and cans engaged by said retarding means; a plurality of abutment members, one for each file of cans, and each adapted to obstructingly engage the front of a file thereof; and means mounting the abutment members on the frame, over the front of the second conveyor, with each abutment member lengthwise in line with a space between divider means and movable back and forth between a rear position in which the abutment members are so disposed that they cooperate to hold the files of cans on the second conveyor in transversely aligned ranks, and a front position in which alternate abutment members across the second conveyor are spaced half a can diameter forwardly of the remaining abutment members, to dispose the files of cans on the second conveyor in zigzagging ranks, the rearmost of which is spaced forwardly of the rank of cans engaged by the retarding means.

5. In a machine of the character described: means including a conveyor for moving upright cylindrical cans forwardly along a defined substantially straight path in laterally adjacent files and into a patterning zone at the front portion of the conveyor; a plurality of abutment elements, each adapted to be engaged by an upright can; carrier means supporting said abutment elements at the front portion of the patterning zone and providing for fore and aft movement of the abutment elements between a first position near the front end of the patterning zone but spaced therefrom and wherein the abutment elements are so aligned across the conveyor that cans urged forwardly by the conveyor into contact with another in the files behind the abutment elements form laterally straight ranks, and a second position at the front end of the patterning zone in which alternate abutment elements are spaced half a can diameter forwardly of the remaining abutment elements to dispose the cans in the files in the patterning zone in laterally zigzagging ranks; and retarding means behind the patterning zone by which an aligned rank of cans can be engaged when the abutment elements are in their first position to prevent said rank of cans from advancing with the conveyor as the abutment elements are moved to their second position, so that a group of cans in the patterning zone can be moved forwardly with the abutment elements, and thereby spaced forwardly from the rank of cans engaged by the retarding means, to permit the cans in said group to be embraced at the front, rear and one side by a U-shaped laterally movable sweep by which said group of cans is moved laterally off of the conveyor means.

6. The machine of claim 5, wherein said abutment elements comprise a plurality of fingers, each engageable with a can; and wherein said carrier means comprises a pair of bars extending transversely across the conveyor means, one of which bars has said alternate abutment elements secured thereto and the other of which has the remaining abutment elements secured to it.

7. In a machine of the character described: means including a fixed frame defining a substantially rectangular horizontal patterning zone; means on the frame for recurrently moving groups of upright cylindrical cans into the patterning zone from the rear thereof, each of said groups comprising a predetermined number of cans aligned in files; conveyor means on the frame for moving cans in the patterning zone forwardly; fore-and-aft extending upright blade-like divider means mounted on the frame for movement parallel to their side surfaces between an operative position in the patterning zone defining lanes in which cans in the patterning zone are confined in files, and an inoperative position out of the patterning zone; and abutment means mounted for movement between an operative position at the front of the patterning zone wherein the abutment means is engageable by the front can of each file of cans moved forwardly by the conveyor means to hold the files of cans in the patterning zone in a predetermined pattern of ranks, and an inoperative position spaced from the patterning zone to be clear of the cans in the patterning zone so that the group of cans in the patterning zone can be swept laterally to one side of said zone by a laterally moving U-shaped sweep without disturbing the pattern of ranks and files of the cans in the group.

8. In a machine of the type having conveyor means on which upright cylindrical cans are aligned into a plurality of laterally adjacent straight files, and are moved forwardly along a defined path toward and into a patterning zone, means for arranging such aligned cans into groups, each group comprising a predetermined number of cans and having the cans arranged in a predetermined pattern of ranks and files, said means comprising: means providing abutments engageable by the front can of each file of cans in the patterning zone; means mounting said abutment means near the front of the patterning zone for back and forth movement parallel to the direction of movement of the conveyor means, to a first position at which cans being urged forwardly along the conveyor means are held against advancement in a first arrangement of ranks and to a second position forward of the first position, in which the cans in the patterning zone are disposed in a predetermined arrangement of ranks and files and in which the cans in the rearmost rank are spaced forwardly from the position occupied by the rearwost rank of cans when the abutment means is in its first position; and holding means releasably engageable with a rank of cans behind the patterning zone when the abutment means is in its first position to confine the cans in said rank against forward motion while cans in front of them are moved forwardly upon movement of the abutment means from its first to its second positions, to thus establish a space between said rank of cans and the cans in the rearmost rank in the patterning zone, which space can be occupied by one leg of a U-shaped sweep movable laterally, open side foremost.

9. The machine of claim 8, further characterized by means for vertically moving the abutment means from its front position to an inoperative position clear of the cans on the conveyor means to permit the cans to be moved laterally off of the conveyor means as a group.

10. In a machine of the type having conveyor means movable forwardly along a defined path and adapted to carry upright cylindrical cans, dividers for aligning cans moving forwardly on the conveyor means into straight files, and abutment means near the front of the conveyor means against which the front can in each file engages and by which cans in the files therebehind are caused to be stopped in ranks, arresting means spaced behind said abutment means to hold a rank of cans against forward movement with the conveyor means while said abutment means is moved forwardly to permit a group of cans ahead of said rank to move with the conveyor means through a predetermined distance, to establish a space between said group of cans and the rank of cans held by the arresting means, said arresting means comprising: a stationary horizontal plate extending transversely across the conveyor means with its upper surface closely adjacent to the level of the top surface of the conveyor means so that upright cans moving forwardly on the conveyor means can readily move onto said plate, the width of said plate, measured lengthwise along the conveyor means, being such that the cans can be moved forwardly onto and off of the plate by the pressure against them of rearwardly adjacent cans on the conveyor means; and clamping means mounted on the machine above said plate for up and down movement to a clamping position engaged with the tops of cans in a rank thereof on the plate to press said cans downwardly against the plate and thus confine them against forward movement in response to the pressure against them of rearwardly adjacent cans on the conveyor means, and to a released position above the cans on the plate leaving them free for forward movement.

11. The machine of claim 10 wherein said clamping means comprises a bar extending across the conveyor means and having a plurality of clamping shoes mounted therebeneath, each shoe being flatwise engageable with a can top and being yieldingly biased downwardly from the bar so as to accommodate itself to slight differences in can heights or in the height of the surface of the plate therebeneath.

12. In a machine of the character described: means including a fixed frame defining a substantially rectangular horizontal patterning zone; means on the frame for moving a predetermined number of upright cylindrical cans into the patterning zone from the rear thereof; fore and aft extending divider means mounted on the frame for vertical movement between an inoperative position vertically clear of cans in the patterning zone, and an operative position defining lanes in the patterning zone by which cans moved into the patterning zone are aligned into a predetermined number of straight files; substantially L-shaped wall means comprising a side wall and a connected front wall, mounted on the frame for horizontal movement laterally across the patterning zone from a normal position in which the side wall extends along the patterning zone at one side thereof and the front wall extends across the front of the patterning zone, to a transfer position in which the side wall extends along the other side of the patterning zone and the front wall projects to said other side of the patterning zone; and plate-like means mounted on the frame for movement to and from a position defining a wall across the rear of the patterning zone which cooperates with said L-shaped wall means to embrace the group of cans in the patterning zone while they are moved laterally out of said zone by movement of said L-shaped wall means from its normal position to its transfer position after the divider means are in their inoperative positions clear of the cans.

13. In a machine for handling upright cylindrical containers, having conveyor means for advancing such containers in files along a defined path: means at the front of said conveyor means defining a zone into which groups of upright containers are advanced by the conveyor means; a group of laterally spaced blade-like upright dividers positioned in said zone to define lanes into which the files of containers are advanced by the conveyor means; transfer means for sweeping a group of containers laterally out of said zone, said transfer means comprising an elongated member which extends lengthwise of the path along which containers are advanced and is translatingly movable in directions transverse to said path between a guiding position laterally adjacent to said group of dividers and cooperating with one of them to define a lane at one side of said zone, and a transfer position at the other side of said zone; means mounting said dividers for movement parallel to their side surfaces between an operative position confining containers in the lanes defined thereby, and an inoperative position clear of containers in said zone and in which the dividers do not interfere wtih transverse movement of the transfer means across said zone to push containers laterally out of said zone; an elongated front member extending transversely to said path at the front of said zone; and gate means movable between an inoperative position clear of advancing containers, and an operative position parallel to said elongated front member at the rear of said zone and cooperating with the elongated front member to preclude endwise displacement of the files of containers as they are pushed laterally out of said zone in a group by the transfer means.

14. The machine of claim 13 further characterized by means for temporarily arresting the advancing motion of containers rearwardly of a group thereof that have entered said zone, to hold the arrested containers in a position behind the gate means at which they will not interfere with movement of the gate means to its operative position.

15. In a machine for handling upright cylindrical containers, wherein conveyor means advances containers along a defined path and recurrently delivers them in groups into a patterning and transfer zone where the containers in each group are arranged in files with the containers in each file half a can diameter out of lateral alignment with the containers in adjacent files and defining staggered ranks, means for moving said groups of containers transversely out of the patterning and transfer zone without disrupting their arrangement, said means comprising: a group of laterally spaced dividers positioned in the patterning and transfer zone to define lanes into which containers are advanced by the conveyor means and by which the containers are held aligned in files; a wall element extending lengthwise of the patterning and transfer zone and mounted for lateral translation across said zone from a container guiding position at one side of said zone in which the wall element is laterally adjacent to the group of dividers and cooperates with one of them to provide a lane at said side of the group of dividers, to a transfer position at the other side of said zone; means mounting said dividers for edgewise movement, as a group, between an operative position confining containers in the lanes defined thereby and an inoperative position clear of containers in the patterning and transfer zone; and means providing a pair of transverse wall elements, parallel to and spaced from one another in the direction of said path a distance to closely confine a group of containers therebetween, said wall elements being cooperable with said lengthwise extending wall element during motion of the latter from its container guiding position to its transfer position to preclude endwise displacement of the containers in the files comprising a group in the patterning and transfer zone as said group is swept laterally out of said zone by the lengthwise extending wall element, the rearmost one of said transverse wall elements being mounted for movement to and from a position at which it is clear of said path and permits containers to be advanced into the patterning and transfer zone.

16. In a machine for handling upright cylindrical containers, having means for moving containers forwardly in files into a patterning zone in which groups of containers are disposed in a predetermined arrangement and out of which they are laterally transferred: means in the patterning zone for momentarily arresting the forward progress of the front container in each file at a first position near the front of the patterning zone, so that a predetermined number of containers is delivered as a group into the patterning zone; means engageable with a rank of containers, consisting of one container in each file, immediately behind the group in the patterning zone to arrest the progress of said rank and the containers therebehind and prevent their entry into the patterning zone; means for moving a group of containers in the patterning zone forwardly in files to a second position, forward of the first, in which alternate files of the containers in the group in the patterning zone are disposed half a container diameter lengthwise out of lateral alignment with the containers in adjacent files to define staggered ranks, and in which second position the rearmost rank of containers in said group is spaced forwardly from the containers in said arrested rank behind the patterning zone; an elongated transfer element extending fore and aft and translatable laterally across the patterning zone from one side to the other thereof for sweeping a group of containers in the second position in the patterning zone laterally out of said zone; means defining a laterally extending elongated confining element at the front of the patterning zone by which forward displacement of containers in a group in the patterning zone is prevented when the group is being moved laterally by said transfer element; and gate means movable to an inoperative position clear of containers advancing into the patterning zone and to an operative position defining a second laterally extending elongated confining element at the rear of the patterning zone, behind the rearmost rank of a group of containers in said zone, which prevents rearward displacement of containers in a group in the patterning zone when the group is being moved laterally by said transfer element.

17. In a machine for handling upright cylindrical containers, having a patterning zone toward and into which such containers are moved forwardly in files along a defined path and from which containers may be laterally transferred by means of a substantially U-shaped sweep moving laterally across said path with its bight portion trailing, means for recurrently arranging containers in said patterning zone in groups, each group including a predetermined number of containers disposed in fore and aft extending files with the containers in alternate files half a diameter out of lateral alignment with the containers in laterally adjacent files to define zigzagging ranks, said means comprising: means at the forward portion of the patterning zone for momentarily arresting the forward progress of the front container of each file entering the patterning zone at a first position near the front of the patterning zone, so that a predetermined number of containers in each file can enter the patterning zone to comprise a group to be transferred; means engageable with a rank of containers immediately behind a group in the patterning zone to arrest the progress of said rank and the containers therebehind and prevent their entry into the patterning zone; and means in the patterning zone for advancing a group of containers therein to a second position in which the containers in the group are in contact with one another along the files and alternate files are disposed half a container diameter out of alignment with adjacent files so that the containers of the group are in a loose honeycomb arrangement, and in which second position the group of containers in the patterning zone is spaced forwardly of its first position so as to establish a space between the rear containers in the group and the arrested rank of containers behind the group, to permit a U-shaped laterally movable sweep to embrace the front, rear and one side of the group and sweep the group out of the patterning zone.

18. In a machine of the type in which upright cylindrical containers are fed forwardly in groups into a patterning zone wherein elongated fore and aft extending blade-like dividers with flat upright side surfaces hold the containers in a predetermined pattern of laterally adjacent files, and which machine has means for arranging containers in the patterning zone in a predetermined pattern of ranks: means on the machine mounting said dividers for movement and constraining them to motion parallel to their flat side surfaces, between an operative container confining position in the patterning zone and an inoperative position removed from the patterning zone and at which the dividers do not interfere with sweeping of a group of containers in the patterning zone laterally out of the same; and means for sweeping patterned containers out of the patterning zone without disrupting their arrangement, comprising an elongated transfer element, means on the machine guiding the transfer element for movement transversely across the patterning zone with the transfer element extending fore and aft of the patterning zone, and container confining elements on the machine extending transversely of the patterning zone at the front and rear thereof, between which the patterned containers move as they are swept out of said zone by the transfer element, and by which displacement of the containers in their respective files is prevented during such movement, the rear one of said container confining elements being movable relative to the machine to enable it to occupy an inoperative position at which it does not interfere with feeding of containers into the patterning zone.

References Cited in the file of this patent

UNITED STATES PATENTS

| | | |
|---|---|---|
| 791,243 | Carlson | May 30, 1905 |
| 2,718,313 | O'Neil | Sept. 20, 1955 |
| 2,788,882 | Swartz | Apr. 16, 1957 |

FOREIGN PATENTS

| | | |
|---|---|---|
| 660,199 | France | July 8, 1929 |

UNITED STATES PATENT OFFICE

CERTIFICATE OF CORRECTION

Patent No. 2,949,179                                                      August 16, 1960

Curtis T. Busse

It is hereby certified that error appears in the printed specification of the above numbered patent requiring correction and that the said Letters Patent should read as corrected below.

Column 5, line 62, for "tht" read -- the --; column 12, line 7, for "alignement" read -- alignment --; lines 54 and 55, strike out "raised", each occurrence; column 13, line 54, for "conveeyor" read -- conveyor --; column 15, line 7, for "rearwost" read -- rearmost --.

Signed and sealed this 31st day of January 1961.

(SEAL)
Attest:

KARL H. AXLINE                                                            ROBERT C. WATSON
Attesting Officer                                                         Commissioner of Patents